United States Patent [19]

Grassi et al.

[11] Patent Number: 4,498,545

[45] Date of Patent: Feb. 12, 1985

[54] AUTOMATIC DEVICE FOR TIGHTENING BOLTS

[75] Inventors: Fabrizio Grassi; Luigi Iannarelli, both of Turin, Italy

[73] Assignee: Prima Progetti S.p.A., Turin, Italy

[21] Appl. No.: 394,714

[22] Filed: Jul. 2, 1982

[30] Foreign Application Priority Data

Jul. 6, 1981 [IT] Italy ............... 67935 A/81

[51] Int. Cl.$^3$ ............................. B25B 13/50
[52] U.S. Cl. .................... 173/43; 81/57.24; 81/57.4
[58] Field of Search ............. 173/43, 12, 42; 81/57.24, 57.35, 57.4; 29/240, 714

[56] References Cited

U.S. PATENT DOCUMENTS

| 2,126,735 | 8/1938 | Cocozella et al. | 81/57.24 |
| 2,678,576 | 5/1954 | Thompson | 81/57.4 |
| 4,239,291 | 12/1980 | Skendrovic | 173/43 |
| 4,246,939 | 1/1981 | Boegel | 29/240 |
| 4,266,451 | 5/1981 | Boudet et al. | 81/57.35 |
| 4,343,367 | 8/1982 | Mashimo | 173/43 |
| 4,413,538 | 11/1983 | Norman | 81/57.24 |

FOREIGN PATENT DOCUMENTS 1087539 8/1960 Fed. Rep. of Germany ..... 81/57.24
102727 6/1982 Japan ..................... 81/57.4

Primary Examiner—Frank T. Yost
Assistant Examiner—Hien H. Phan
Attorney, Agent, or Firm—Michael N. Meller

[57] ABSTRACT

An automatic bolt tightening device for assembling mechanical members placed on a buck arranged above the bolt tightening device. The bolt tightening device is provided with a headstock which is translatable along three mutually perpendicular axes. A rotatable spindle, arranged on the headstock, cooperates with the terminal part of a tang, which in turn cooperates with bolts for assembling the members. The translation of the headstock and the rotation of the spindle are actuated by motors which are controlled by a processing unit. A plurality of sensors detect the positions of the buck relative to the bolt tightening device and of the spindle relative to the tang, and output error signals to the processing unit. The processing unit controls the operation of the motors, thereby translating the headstock until the spindle and tang are coaxial. A feeler device, comprising a plurality of hinged longitudinal plates, surrounds the spindle and is deflected by a terminal portion of the tang when the tang and spindle are not coaxial. Sensors detect the plate deflection and output error signals to the processing unit.

6 Claims, 4 Drawing Figures

AUTOMATIC DEVICE FOR TIGHTENING BOLTS

BACKGROUND OF THE INVENTION

The present invention relates to a bolt tightener for the automatic assembling of mechanical members.

In particular, the present invention relates to a bolt tightener specially, but not solely, suitable to be used for the connection of various mechanical members to a frame of a motor vehicle mounted on a buck and provided with equipped platforms which are adjustable for supporting members to be connected.

It is known that in order to connect mechanical members (for instance, motors, transmissions, suspensions, tanks) to the frame of a vehicle (for example, a truck), one of the systems most used is the so-called "buck-system", in which the frame of the vehicle is arranged on an equipped support or mounting buck, to which the members to be assembled are delivered on moving platforms.

The automation of the various connecting operations, usually consisting in the tightening of bolts has suffered in the past years from many difficulties due partly, to the inaccuracy of the positioning of the bucks in relation to fixed references, and partly to the production tolerances of the mechanical members to be assembled.

SUMMARY OF THE INVENTION

The object of the present invention is to obviate the afore-mentioned difficulties to facilitate the automatic assembling of several mechanical members, in particular the mechanical members of a vehicle on the frame thereof.

This object is realized by the present invention in that it relates to a bolt tightener for the automatic assembling of several mechanical members, in particular the members of a vehicle to the frame thereof, on a buck placed above the said screwer. The bolt-tightener comprises a movable headstock provided with a rotatable spindle, the headstock and spindle being responsive to the forces of corresponding actuating means, and displaceable along at least three axes. The bolt tightener in that it includes a processing unit suited to control the actuating means, first sensor means, connected to the processing unit, to detect the position of the buck relative to the bolt tightener, and second sensor means, suited to cooperate with screwing tangs for connecting the bolts of the members, the sensor means delivering error signals to the actuating means.

BRIEF DESCRIPTION OF THE DRAWINGS

For a better understanding of the present invention, a description of a nonlimiting embodiment thereof will be described with reference to the accompanying drawings, in which.

DETAILED DESCRIPTION OF THE INVENTION

Figure 1:
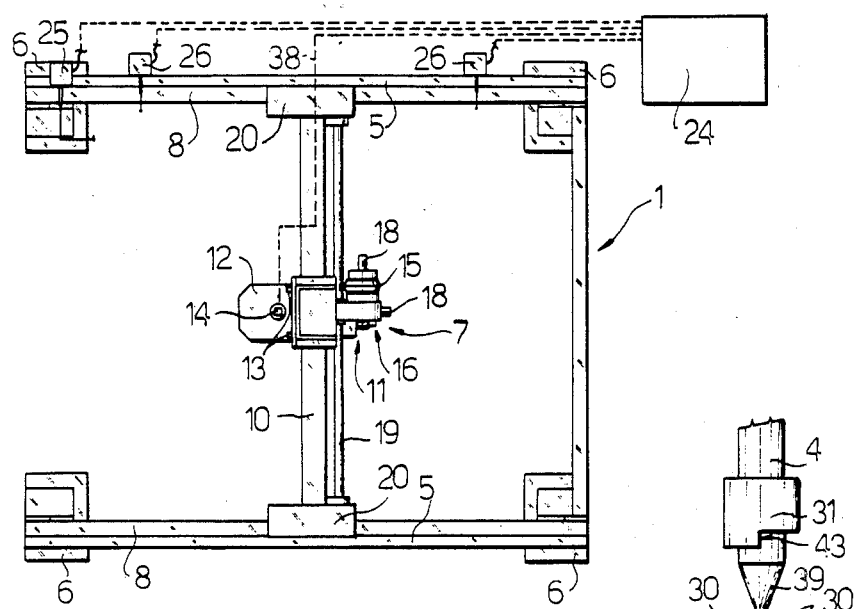
FIG. 1 is a plan view of a bolt tightener according to the present invention.
Figure 2:
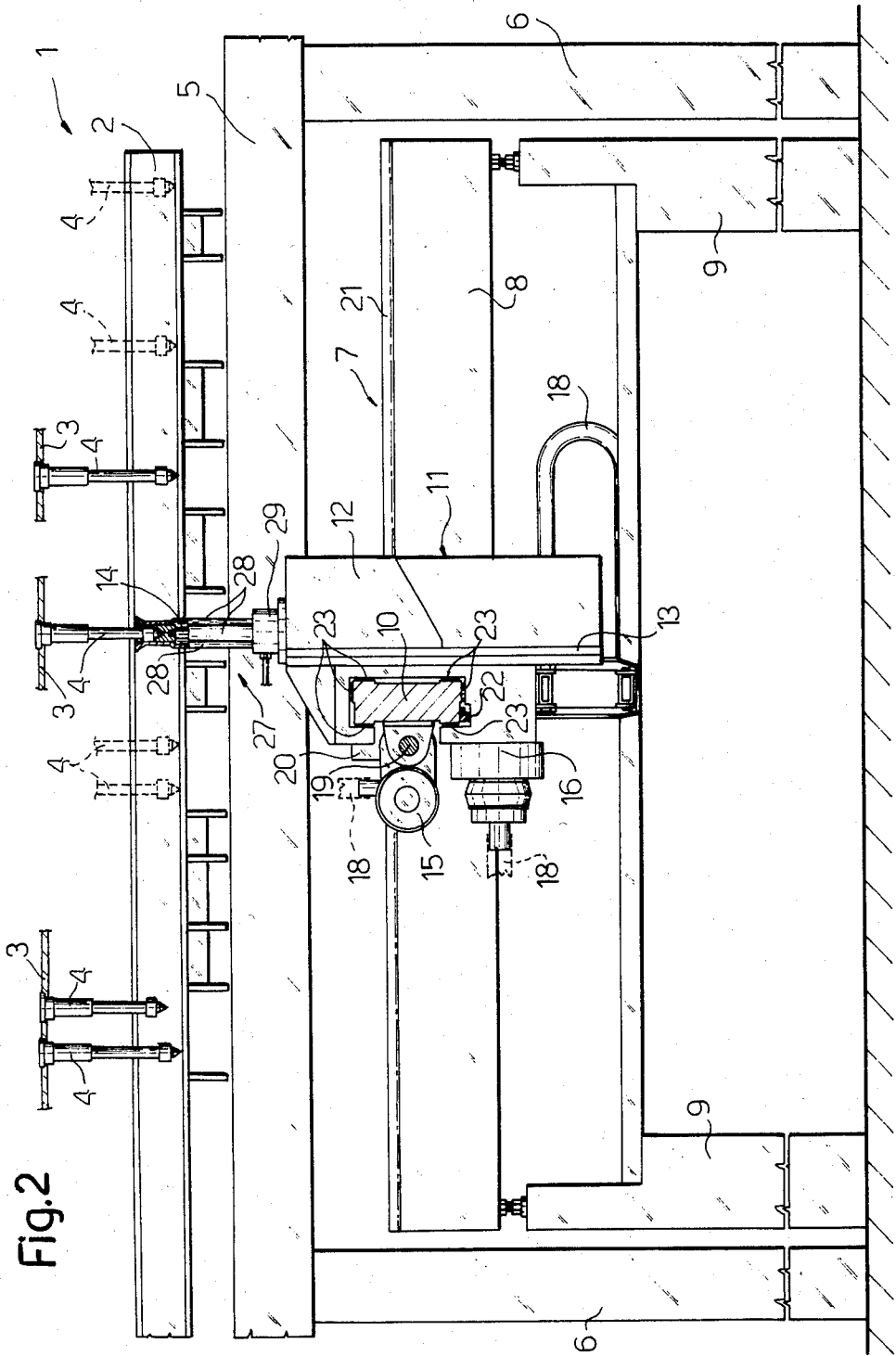
FIG. 2 is a longitudinal cross-sectional view of an assembling station including the bolt tightener of FIG. 1, in enlarged scale.
Figure 4:
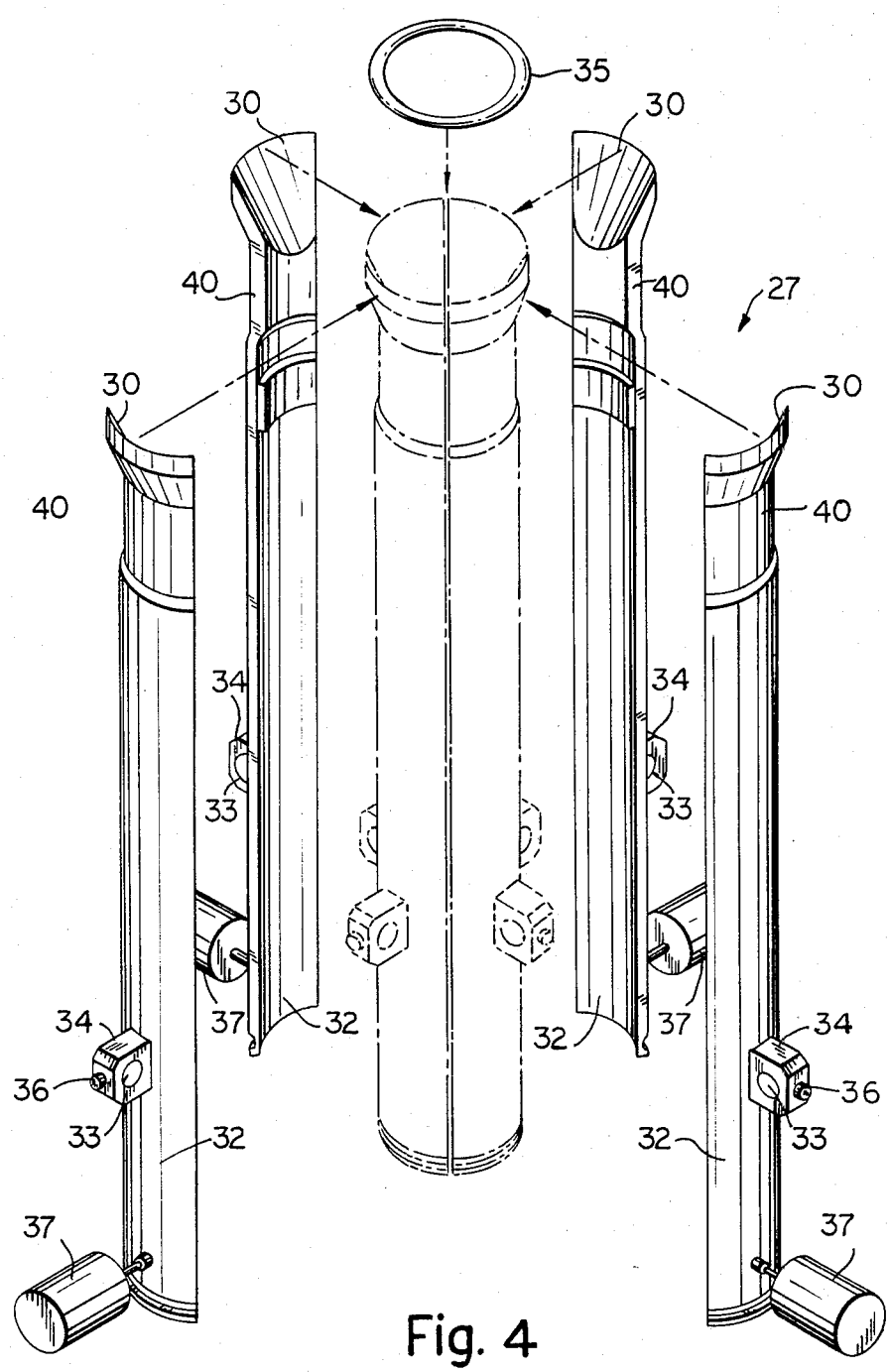

FIGS. 1 and 2 illustrate an assembling station, denoted in general by the numeral 1, to fasten mechanical members, not shown, to a frame, not shown, of a vehicle, arranged on an equipped buck 2, provided with platforms 3 movable on air pads, bearing screwing tangs 4 aligned with fastening bolts (not shown) for fastening the members to the frame. The buck 2 is of a known type, and therefore will not be further described. It bears on support beams 5 sustained by four uprights 6 and is arranged above a bolt tightener 7.

The bolt tightener 7 comprises two straight slides 8, which are substantially parallel to the beams 5 and supported by means of uprights 9 and on which a stiff cross member 10 acting as a guide and support for a trolley can be 11. This trolley is in turn provided with a spindle headstock 12, movable along slides 13 which are integrally formed on the trolley 11 and are disposed perpendicular to the directions of movement of the trolley 11 along the cross member 10. The headstock 12 is provided with a rotating spindle 14, which is displaceable, together with the headstock 12, along three axes substantially perpendicular to each other.

The movement of the trolley 11 and the cross member 10 is produced by means of electric (or hydraulic) motors 15 and 16 connected by flexible cables (or pipes) 18 to a drive unit not shown.

In particular, motor 15 is rigidly fixed to the middle of the cross member 10, and drives the rotation of a transmission shaft 19 disposed parallel to the cross member 10.

Shaft 19 is provided at opposite ends thereof with two sprockets, not shown, which are arranged inside respective boxes 20 and mesh with respective racks 21 formed on the parallel slides 8. The rotational movement of the shaft 19 is hence transformed by means of the racks 21 and the respective sprockets into linear movement of the cross member 10 along the slides 8. Motor 16 is rigidly fixed to the trolley 11 and is suited to rotate a sprocket (not shown) arranged in the trolley 11. This sprocket meshes with a rack 22 which is integrally formed with the cross member 10, and such that in response to rotation of the sprocket, the trolley 11 moves in a direction perpendicular to the direction of movement of the cross member 10. Cross member 10 is further provided with pads 23 made of low-friction material. Inside the headstock 12 are further arranged two actuating devices, not shown, the first of which rotates the spindle 14, and the second of which displaces the headstock 12 along the slides 13.

All movements of spindle 14 are controlled by a processing logic unit 24 of the learning type, arranged close to the buck 2. The unit 24 is connected to a sensor 25, whose follower is movable along a line parallel to the slides 8, and to two sensors 26, whose followers are movable along a line parallel to the cross member 10. The sensors 25 and 26 are suited to cooperate with the buck 2 to detect the exact assembling position thereof in relation to the bolt tightener 7.

Figure 3:
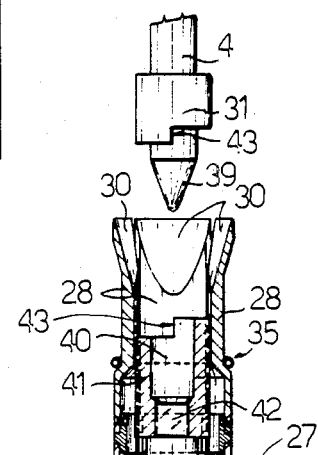
FIG. 3 is a longitudinal cross-sectional view of a member of the bolt tightener of FIG. 1.
Figure 3:
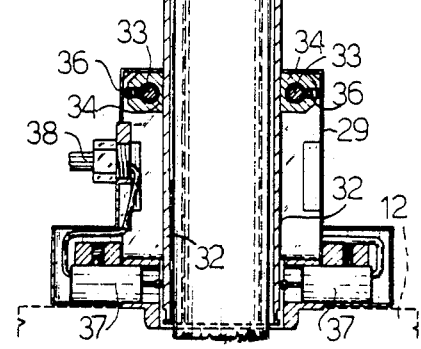

In addition to the rotating spindle 14, with the headstock 12 is provided a feeler device 27, shown in detail in FIG. 3, which device is arranged concentic with the spindle 14, which is embedded in the feeler device 27. The feeler device 27 includes four shaped elastic plates 28, arranged around the spindle 14, and a base box 29 rigidly fixed to the headstock 12. The group of four plates 28 forms a substantially cylindrical jacket, in which the spindle 14 is movable. Each plate 28 has an end 30 outwardly bent and suited to cooperate with a cylindrical terminal portion 31 of each tang 4. The plates 28 are further hinged to the box 29, close to their ends 32 opposite ends 30, by means of pins 33 rotatably engaged through respective tabs 34, each integrally formed with a respective plate 28 and extending in a direction substantially radial to the spindle axis. In this way, the plates 28 can rotate outwardly with respect to the spindle axis about the pins 33 against the action of an elastic means formed by a ring 35 fitted on the cylindrical jacket formed by the group of plates 28. Set screws 36 act to adjust the clearances on pins 33. The plates 28 are arranged in a predetermined position with respect to the spindle 14, so as to lie parallel to the spin axis of the spindle 14 when they are not engaged with the portions 31. Further, the plates 28 are arranged in facing pairs, the midplane of a first of these lying parallel to the cross member 10, and the midplane of the second pair lying parallel to the slides 8.

The box 29, in which ends 32 are arranged, contains linear followers 37 in a radial position, one for each plate 28, connected by means of a cable 38 to the unit 24. The followers 37 detect the displacements of the ends 32 due to rotations of the plates 28 caused by forces acting on the folded ends 30 and produce an error signal, proportional to the displacement. This signal is then transmitted to the unit 24 to control the displacement of the headstock 12. Each tang 4 ends with a conical point 39 engageable in a hole 40 of a screwing tool 41, which is angularly coupled with a quadrangular extension 42 of the spindle 14 and which may be coupled to the tang 4 through a clutch 43.

In use, the buck 2 is placed on the fixed frame of the station 1 with an operation that usually does not allow a great positioning precision. In general, the buck 2 is placed on the station 1 inaccurately with respect to a a theoretic exact position, amounting to as much as several centimeters.

The position taken by the buck 2 on the station 1 is immediately detected by sensors 25 and 26, which allows the position of two reference axes of the buck 2 with respect to the bolt tightener to be determined 7.

The signals corresponding to the position of the two reference axes is sent to the unit 24, in which the coordinates of the tangs 4 are stored. These coordinates are theoretic in that they do not take into account the incorrect positioning of the buck 2 on the station 1 and the manufacturing tolerances of the frame (not shown) mounted on the buck 2.

The information received from the sensors 25 and 26 enables the unit 24 to recalculate the coordinates of the tangs 4 with respect to the two true axes of the buck 2, adjusting, in this way, the positioning inaccuracies thereof with respect to the bolt tightener 7.

The rectified coordinates which result do not correspond exactly to the true coordinates of the tangs 4, because the holes, with respect to which the tangs 4 are positioned, are offset due to manufacturing tolerances.

When the headstock 12 is raised by the unit 24 in order to engage the first tang 4 of the first platform 3, according to a stored sequence, the feeler device 27 is not coaxial with the tang 4 and therefore the folded ends 30 of one or two of the plates 28 are engaged by the portion 31. At least one of the plates 28 is shifted from the predetermined position of parallelism with respect to the spindle 14, against the action of the elastic ring 35. This shift is detected by the sensors 37, which emit an error signal to the processing unit 24, which acts on the motors 15 and 16, by means of a circuit known and not illustrated. The motors 15 and 16 control the movement of the headstock 12 until the error disappears.

In this way, during the rise of the headstock 12, the sensors 37 allow the correction, in real time, of the positioning error due to the manufacturing tolerances of the frame, so that when the spindle 14 contacts the tang 4, it is perfectly coaxial with the tang.

The corrections carried out, as a consequence of the action of the feeler device 27, on the coordinates of the first tang 4 engaged by the spindle 14, are recorded by the unit 24, which carries out, in its storage, an analogous correction of all the coordinates of the tangs 4 of the same platform 3. In other words, the existence of the feeler device 27 allows not only the correct positioning of the spindle beneath the first tang 14, but also the use of the learning ability of the unit 24, which during the work is able to automatically rectify the information stored, thereby reducing to a minimum the working times.

After the action on the first tang 4, the unit 24 carries out an action on the next tang 4 of the same platform 3. Also in this case, the feeler device 27 allows the further correction of the coordinates both of the second tang 4 and of the remaining tangs of the same platform 3. At this point, the unit 24 usually cuts out the feeler device 27, since the true positions of all the tangs 4 of the platform 3 in question have been already identified with sufficient accuracy.

The above-described operations are repeated by the bolt tightener 7 for all of the platforms 3, until completion of the connection to the frame (not illustrated) of the members (not illustrated) supported by the same.

We claim:

1. An automatic bolt tightening device for assembling mechanical member placed on a buck arranged above said tightening device, comprising:
   (a) a headstock which is translatable along three mutually perpendicular axes;
   (b) a spindle arranged on and rotatable with respect to said headstock;
   (c) a plurality of actuating means which control the translation of said headstock and the rotation of said spindle;
   (d) a processing means for controlling said actuating means;
   (e) reference means for indicating the position of bolts to be tightened on said members; and
   (f) first sensor means for sensing engagement with said reference means,
wherein in response to engagement of said reference means, said first sensor means outputs error signals to said processing means, which in turn controls said actuating means to translate said headstock.

2. An automatic bolt tightening device according to claim 1, wherein said first sensor means comprises a feeler device arranged coaxially with said spindle and rigidly fixed on said headstock, said feeler device being configured to cooperate with said reference means.

3. An automatic bolt tightening device according to claim 2, wherein said reference means comprises a tang configured for tightening said bolts, said feeler device being configured to cooperate with a terminal portion of said tang.

4. An automatic bolt tightening device according to claim 2, wherein said feeler device comprises a plurality of longitudinal plates arranged to form a substantially cylindrical jacket surrounding said spindle, each of said plates being hinged at a fixed point along the length of said feeler device and having ends which protrude beyond the free end of said spindle, and further comprises a plurality of followers, each of which is coupled to one of said plates for sensing the deflection of the respective protruding ends of said plate and for outputting an error signal proportional to said deflection.

5. An automatic bolt tightening device according to claim 1, further comprising second sensor means for sensing the position of said buck relative to said tightening device and outputting position signals to said processing means.

6. An automatic bolt tightening device according to claim 5, wherein said second sensor means comprises at least three sensors arranged to cooperate with said buck, the first and second of which are provided with followers disposed parallel to each other and the third of which is provided with a follower disposed at a predetermined angle different from zero relative to said followers of said first and second sensors, said followers being disposed substantially perpendicular to said spindle.

* * * * *